(12) United States Patent
Martin et al.

(10) Patent No.: US 6,273,752 B1
(45) Date of Patent: Aug. 14, 2001

(54) MODULAR CONNECTOR PANEL

(75) Inventors: Dale D. Martin, East Lyme; Steven O. Fournier, Southington; Rudolph A. Montgelas, West Hartford, all of CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/492,867

(22) Filed: Jan. 27, 2000

(51) Int. Cl.⁷ ....................................... H01R 9/22
(52) U.S. Cl. .......................... 439/540.1; 439/557
(58) Field of Search ........................ 439/540.1, 544, 439/552, 553, 557, 562; 200/296; 248/27.3

(56) References Cited

U.S. PATENT DOCUMENTS

| | | | |
|---|---|---|---|
| 2,160,713 | * 5/1939 | Bentley | 439/544 X |
| 3,944,176 | * 3/1976 | Danko | 439/540.1 X |
| 4,163,882 | * 8/1979 | Baslow | 200/296 |
| 4,386,252 | * 5/1983 | Kondo et al. | 200/296 |
| 6,086,415 | * 7/2000 | Sanchez et al. | 439/540.1 |

* cited by examiner

Primary Examiner—Renee Luebke
(74) Attorney, Agent, or Firm—Mark S. Bicks; Alfred N. Goodman

(57) ABSTRACT

A modular connector panel has a planar front panel with opposite surfaces. A plurality of panel openings extend through the panel in an aligned array. Support members extend from a surface of the panel and have near ends connected to the panel and remote ends spaced from the panel. Abutments extend laterally from the remote ends of the support members and parallel to the panel, and have abutment surfaces facing the panel. The abutments are arranged in pairs, with each pair being aligned with a panel opening. A connector can be coupled by engaging a pair of abutments and extending into a panel opening.

20 Claims, 4 Drawing Sheets

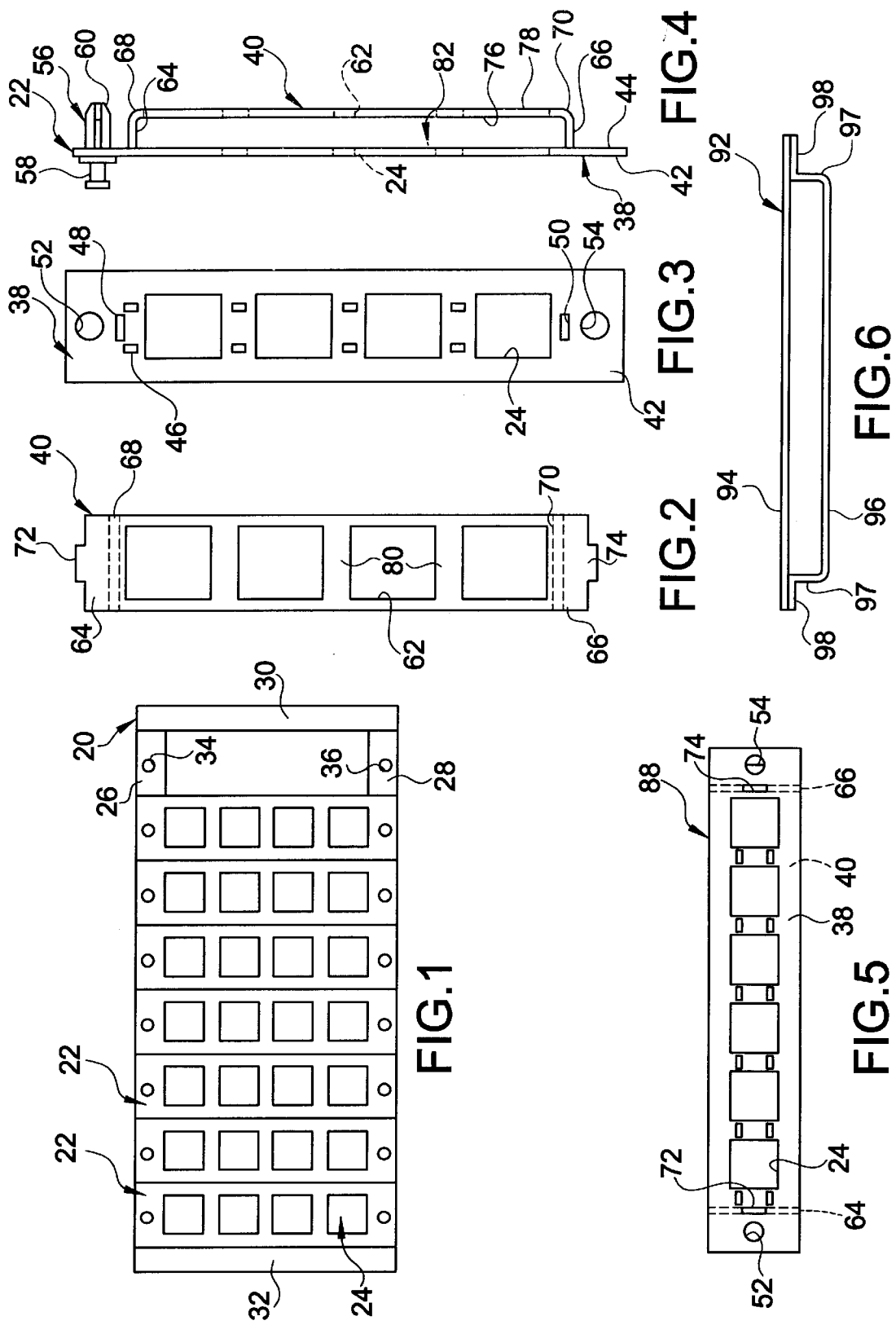

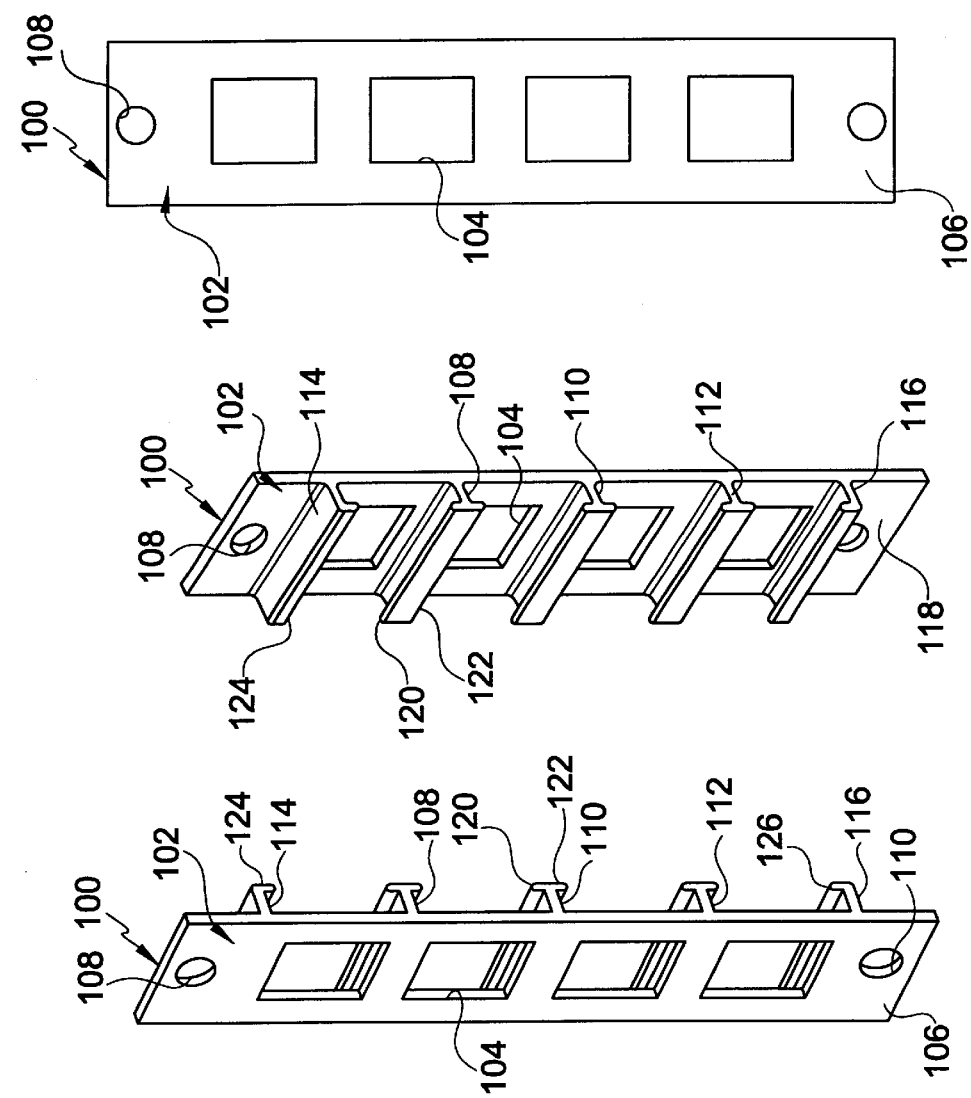

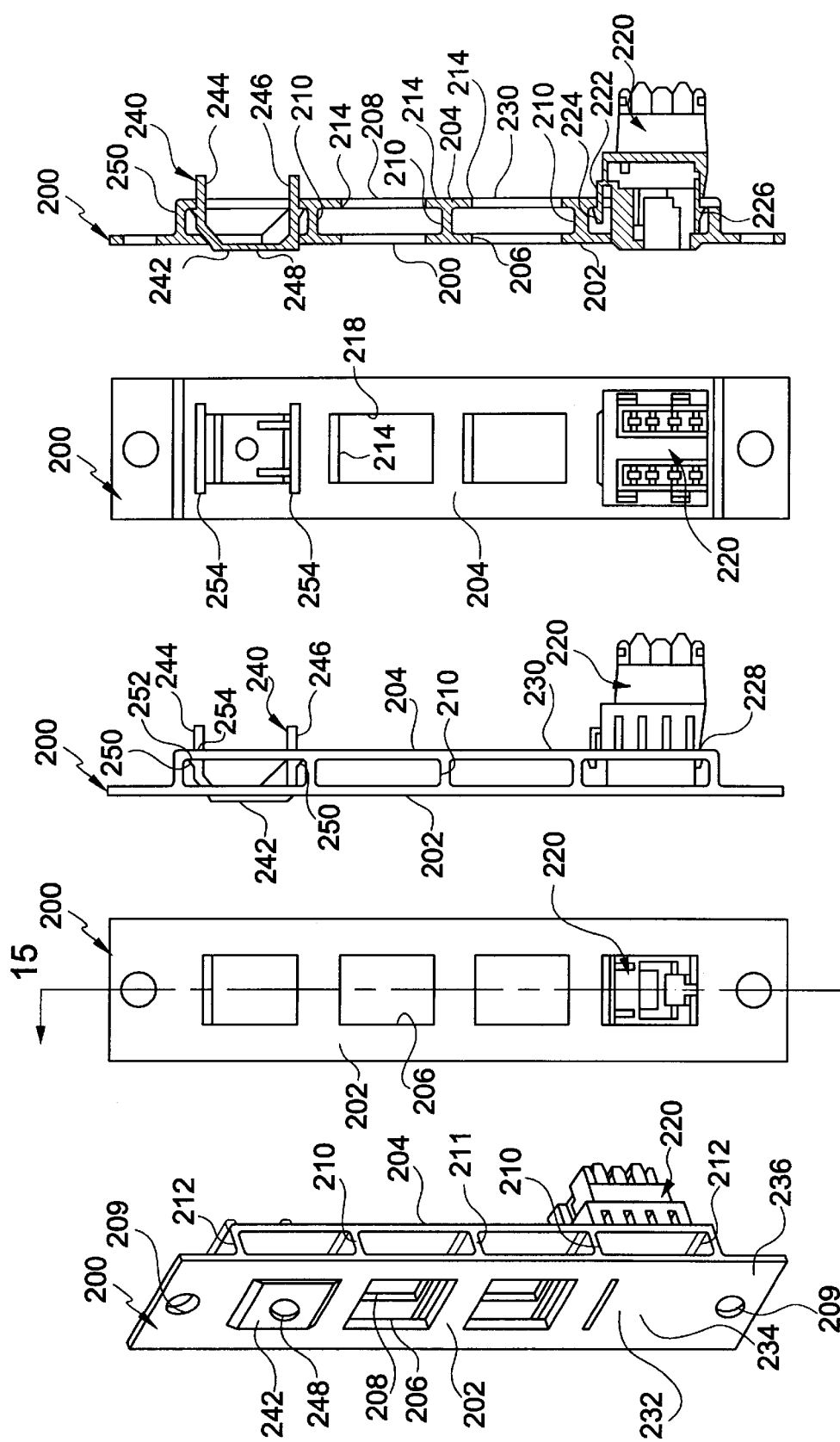

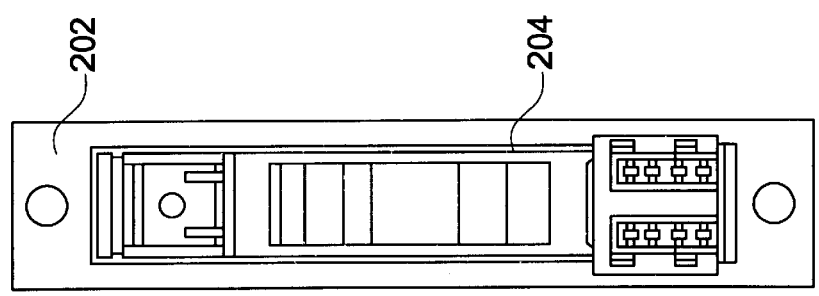
FIG. 19
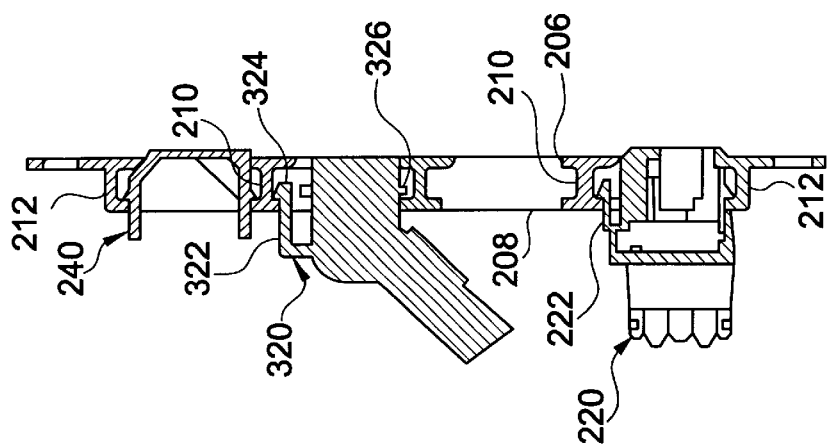
FIG. 18
FIG. 17
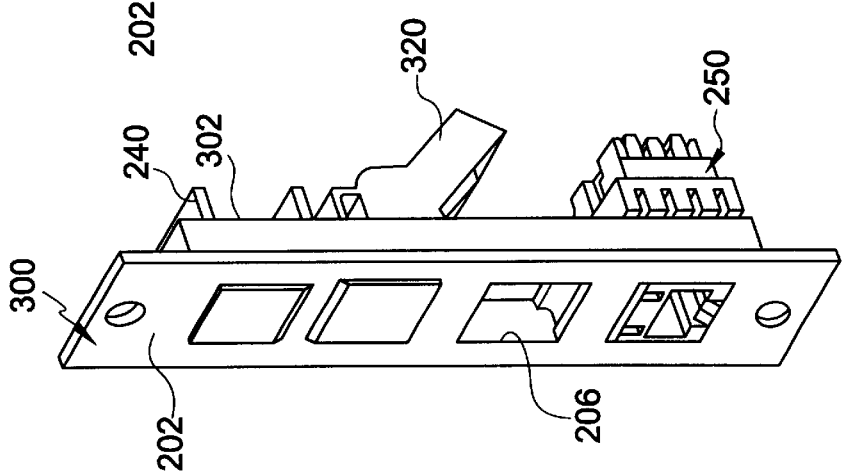
FIG. 16

MODULAR CONNECTOR PANEL

FIELD OF THE INVENTION

The present invention relates to modular multimedia adapter interconnect panels that can be installed in a wide variety of different fiber optic or telecommunications enclosures and patch panels and that can support a multitude of different adapters or connectors. More particularly, the present invention relates to modular connector panels having a panel with panel openings into which electrical and/or fiber optic connectors can be located and having abutments spaced from panel openings for resiliently latching the connectors in place.

BACKGROUND OF THE INVENTION

Electrical and optical circuit enclosures and patch panels for telecommunications and other systems must have mountings for supporting the connectors for coupling and electrical wires and fiber optic cables interconnecting the various parts of each system. Conventional mountings are specifically constructed for specific types of connectors. Different connectors require different mountings and interconnect panels The use of different mountings for different connectors requires additional expense for separate manufacturing, inventories and installations. Further, the conventional mountings require considerable space for a given number of connectors, particularly when a number of differently configured connector panels are required.

SUMMARY OF THE INVENTION

An object of the present invention is to provide a modular connector panel which can be used to support wide variety of electrical and fiber optic connectors.

Another object of the present invention is to provide a modular connector panel which efficiently supports a number of different connectors and which can be efficiently mounted in a ganged manner.

A further object of the present invention is to provide a modular connector panel which is simple and inexpensive to manufacture and use, and which is of rugged construction.

Yet another object of the present invention is to provide a modular connector panel which allows flush mounting of jacks and adapters for interconnecting fiber optic and electrical connectors.

The foregoing objects are basically obtained by a modular connector panel comprising a planar panel, a plurality of openings extending through the panel in an aligned array, and support members with abutments. The support members extend from a panel surface, and have near ends connected to the panel and remote ends spaced from the panel. The abutments extend laterally from the remote ends of the support members and parallel to the panel, such that abutment surfaces on the abutments face the panel. The abutments are arranged in pairs with each pair being aligned with the respective panel opening.

A connector can be coupled by engaging one pair of abutments and extending in the respective panel opening. This arrangement allows the panel to support a wide variety of electrical and fiber optic connectors in an efficient manner to avoid separate manufacturing and inventories of different connector panels. Additionally, multiple panels can be easily and efficiently gagged side-by-side in an enclosure or patch panel.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a front elevational view of a circuit enclosure or patch panel with a plurality of modular connector panels according to the present invention mounted thereon;

FIG. 2 is a front elevational view of a rear panel of a modular connector panel according to a first embodiment of the present invention, prior to being bent;

FIG. 3 is a front elevational view of a front panel of a modular connector panel for use with the rear panel of FIG. 2;

FIG. 4 is a side elevation view of a modular connector panel with the rear panel of FIG. 2 and the front panel of FIG. 3, and with a single fastener;

FIG. 5 is a front elevational view of modular connector panel according to a second embodiment of the present invention;

FIG. 6 is a side elevation view of a modular connector panel according to a third embodiment of the present invention;

FIG. 7 is a front perspective view of a modular connector panel according to a fourth embodiment of the present invention;

FIG. 8 is a rear prospective view of the modular connector panel of FIG. 7;

FIG. 9 is a front elevational view of the modular connector panel of FIG. 7;

FIG. 10 is a side elevational view of the modular connector panel of FIG. 7;

FIG. 11 is a front perspective view of a modular connector panel according to a fifth embodiment of the present invention;

FIG. 12 is a front elevational view of the modular connector panel of FIG. 11;

FIG. 13 is a side elevational view of the modular connector panel of FIG. 11;

FIG. 14 is a rear elevational view of the modular connector panel of FIG. 11;

FIG. 15 is a side elevational view in section taken along line 15—15 of FIG. 12;

FIG. 16 is a front perspective view of a modular connector panel according to a sixth embodiment of the present invention;

FIG. 17 is a front elevational view of the modular connector panel of FIG. 16;

FIG. 18 is a side elevational view in section taken only line 18—18 of FIG. 17; and FIG. 19 is a rear elevational view of the modular connector panel of FIG. 16.

DETAILED DESCRIPTION OF THE INVENTION

Referring initially to FIG. 1, an electrical and optical circuit enclosure or patch panel 20 is graphically illustrated. The enclosure or patch panel mounts or supports a plurality of modular connector panels 22. Each of the panels has a plurality of panel openings 24 in an aligned array in which electrical and/or optical connectors can be mounted and resiliently latched in place, as described in greater detail hereinafter.

Enclosure or patch panel 20 includes a rectangular frame formed by an upper member 26, a lower member 28, and side members 30 and 32. The upper and lower members 26 and 28 include fastener receiving openings 34 and 36, respectively. These fastener receiving openings receive fasteners extending through connector panels 22 for securing the panels to frame members 26 and 28, in a simple, rapid and secure manner.

The first embodiment of the connector panel is illustrated in greater detail in FIGS. 2–4. The connector panel comprises a first or front panel 38 and a second or rear panel 40. Front panel 38 is rectangular and extends along a vertical longitudinal axis, as illustrated in FIG. 3. The plurality of rectangular panel openings 24 extend through front panel 38 from its outer surface 42 to its inner surface 44. The four illustrated panel openings are arranged in a aligned array along the panel longitudinal axis.

Pairs of small rectangular openings are formed in panel 38 adjacent the upper side of each panel opening 22 for receiving and retaining labels or icons to identify the connectors in the adjacent or respective front panel opening. Openings 46 are spaced apart by a distance less than the width of each panel opening.

Rectangular connection passages 48 and 50 extend through the panels adjacent the longitudinal ends of the array of panel openings. The longitudinal axis of the connection passage are parallel to each other and perpendicular to the longitudinal axis of panel 38.

Fastener receiving bores 52 and 54 extend through panel 38 adjacent its opposite ends. The bores 52 and 54 are spaced apart by a distance equal to the vertical spacing of openings 34 and 36 in the enclosure or patch panel interconnect frame. In this manner, the respective fastener openings and fastener bores can be aligned to allow a fastener to pass therethrough to secure each connector panel in place on the enclosure or patch panel 20.

Preferably, the fasteners are conventional push-pull pins 56. These pins are securely mounted in fastener receiving bores 52 and 54. One pin is illustrated in FIG. 4 in its release position. When pin member 58 is pushed into collet 60, the collet expands. Connector panel 22 is initially placed on the enclosure or patch panel 20 with each push-pull pin in the position illustrated in FIG. 4 such that collets 60 can readily pass through fastener openings 34 and 36. With the connector panel properly mounted, pin members 58 are depressed expanding collets 60 and securing the respective connector panel 22 to enclosure or patch panel 20.

Rear panel 40 is generally rectangular and extends along a vertical longitudinal axis, as illustrated. The rear panel also comprises a plurality of rear panel openings 62 arranged in an aligned array along the rear panel longitudinal axis. The rear panel includes support members 64 and 66 which are formed as integral or unitary parts of the rear panel and are coupled to the remainder of the rear panel by bends 68 and 70. FIG. 2 illustrates the rear panel in a fully planar position prior to being bent to the configuration illustrated in FIG. 4.

The opposite ends of the rear panel have outwardly extending rectangular tabs 72 and 74. The tabs are shaped to fit within connection passages 48 and 50.

After the front and rear panels are formed as illustrated in FIGS. 2 and 3, rear panel 40 is deformed at bends 68 and 70 to form right angles between support members 64 and 66 and the remainder of the rear panel. Tabs 72 and 74 are then located in connection passages 48 and 50, respectively, and then welded in place and ground to provide a smooth outer surface 42 on front panel 38. Rear panel inner surface 76 faces front panel inner surface 44, while outer surface 78 of rear panel 40 faces in a direction opposite to outer surface 42 of front panel 38.

Front panel openings 24 are generally axially aligned with rear panel openings 62. However, the rear panel openings are somewhat larger in the illustrated embodiment. The rear panel opening can be different from the front panel openings for allowing the jack latch to fit for flush mounting.

The portions of rear panel 40 surrounding or adjacent openings 62 form abutments 80, with rear panel surfaces 76 and 78 forming abutment surfaces. These abutments engage resilient latches on the connectors for securing the connectors to connector panels 22 such that the connectors extend across gap 82 between the front and rear panels and into panel openings 24.

Support members 64 and 66 secure rear panel 40 to front panel 38 and extend between these two panels to define the gap 82. The ends of the support members remote from the front panel are integral or unitarily connected to the rear panel by bends 68 and 70. The near ends of the support members relative to the front panel are secured thereto by the interconnection of the tabs 72 and 74 in connection passages 48 and 50.

The abutments formed by the rear panel border areas defining rear panel openings 62 are arranged in pairs. With each such pair of abutments is aligned with a respective first panel opening 24.

In the first embodiment, a set of four openings are provided in each of the front and rear panels. However, any suitable number of openings can be provided therein depending on the size of the openings required and the longitudinal length of connector panel 22. In the second embodiment illustrated in FIG. 5, the connector panel 88 is provided with six panel openings 24. Otherwise, connector panel 88 is identical to connector panel 22 and the features thereof are identified with like reference numbers.

The first and second embodiments are preferably made of metal. Although they can be made of any suitable other materials such as plastic.

Referring to FIG. 6, connector panel 82 according to a third embodiment of the present invention comprises a front panel 94 and a rear panel 96. The front and rear panels are substantially configured as illustrated for the first embodiment with front panel openings, rear panel openings and fastener receiving bores. The rear ends of support members 97 terminate in flanges 98. Flanges 98 overly and are bonded to the inside surface of front panel 94. This arrangement is particularly useful in forming the two panels of plastic. Additionally, the two panels can be formed as a unitary extrusion of plastic.

Referring to FIGS. 7–10, a modular connector panel 100 according to a fourth embodiment of the present invention comprises a front panel 102 with a plurality of panel openings 104 extending through the front panel. Its outer surface 106 is planar. Fastener receiving bores 108 and 110 extend through the front panel adjacent its opposite ends.

Middle support members 108, 110 and 112 and end support members 114 and 116 extend from front panel inner surface 118. The middle support members extend from the front panel between each of the front panel openings. The end support members extend from the front panel inner surface adjacent the ends of the aligned array of openings 104. Each of the middle members has a pair of oppositely directly abutments 120 and 122. The end members have single abutments 124 and 126. Abutments 124 and 126 extend in opposite directions from their respective end members and are directed toward one another.

In middle and end support members are of the same lengths such that the abutments 120, 122, 124 and 126 are generally located in the same plane and spaced the same distance from front panel inner surface 118. The various support members are connected at their near ends to the front panel and at their ends remote from the front panel to the abutments at a location spaced from the front panel.

The oppositely directed abutments extending laterally inwardly from opposite longitudinally ends of each front panel opening provide a pair of abutments associated with that respective opening. Such pair facilitates latching of a connector to the panel such that a portion of the connector extends into front panel opening 104.

Connector panel 100 can be made by any suitable form. For example, it can be formed by extruded or molded plastic.

Referring to FIGS. 11–15, a modular connector panel 200 according to a fifth embodiment of the present invention comprises a front panel 202 and a rear panel 204. Panels 202 and 204 can be molded or extruded from plastic as a unitary, one piece structure. The front panel has a plurality of rectangular openings 206 in an aligned array along the longitudinal axis of the front panel. The rear panel also comprises a plurality of rectangular rear panel openings 208 in an aligned array along the longitudinal axis of rear panel 204. The front panel also has fastener receiving bores 209 adjacent its opposite longitudinal ends.

The two panels are joined by middle support members 210 extending perpendicular to and connected to the front and rear panels between the respective panel openings and by end support members 212 extending perpendicular to and connected to the front and rear panels adjacent ends of the aligned arrays of panel openings. In this manner, the near ends of support members are connected to the front panel, while the remote ends of the support members are spaced from the front panel and are connected to the rear panel. Portions of the rear panel adjacent peripheries or edges of the rear panel openings 208 from abutments 214 extending laterally from the remote ends of the support members and parallel to the front panel. The inner surface of the rear panel facing the front panel provides abutment surfaces facing the front panel. The top and bottom edges of each rear panel opening provide a pair of abutments aligned or associated with one of the front panel openings.

A typical electrical connector 220 for connecting copper wires to telecommunications circuits and for mounting in any of the connector panels of the present invention is of the type disclosed in U.S. Pat. No. 5,399,103 to Gentry et al, the subject matter of which is hereby incorporated by reference. Connector 220 has a resilient latch arm 222 with a tapered projection 224 at its free end. The opposite side of the connector has another tapered projection 226. The tapered projections have flat abutment surfaces which engage abutments 80, 120, 122, 124, 126 and/or 214 to latch the connector in place. A peripheral shoulder 228 abuts the outer surface of rear panel 40, 96 or 204 about each opening or of the abutments of connector panel 100. In this manner, the rear panel abutments are trapped between the tapered projections 224 and 226 and the connector shoulder 228. The relative dimensions of the connector and of the spacing between a front and rear panels locates the connector front face 232 with its jack opening 234 generally in the plane of the outer surface of front panel.

Alternatively, an adapter 240 can be mounted within any of the panel openings of connector panel 22, 88, 92, 100, 200 or 300. Adapter 240 is a generally resilient structure having a front section 242 and legs 244 and 246. For example, the front section extends into front panel opening 206 and has a connector receiving passageway 248. Such passageway is particularly adapted for receiving coaxial cable or fiber optic cable connectors.

Each of the adapter legs comprises a tapered abutment intermediate the leg ends and extending laterally outwardly. Each leg tapered abutment has a shoulder surface 252 extending from the leg outer surface for engaging an inner surface of an abutment 214. Each leg also has an end abutment 254 extending from each leg, in and out of the plane of the drawing of FIG. 13 to engage rear panel outer surface 230. Each end abutment forms a second shoulder surface extending laterally from an adapter leg end remote from its front section. In this manner, the end abutment shoulders and the shoulders of the tapered abutments engage the outer and inner surfaces, respectively, of the rear panel abutments to positively latch adapter 240 in place on connector panel 200, with its front panel 242 substantially in the plane of front panel outer surface 236.

Adapters 240 can also be formed without an connector passageway 248. Such adapters would then be used for closing openings in the connector panel 200 which are not currently in use.

Referring to FIGS. 16–19, a connector panel 300 according to a sixth embodiment of the present invention is illustrated. Connector panel 300 is similar to connector panel 200, with like features being identified with like reference numbers. The connector panel of the sixth embodiment differs from the connector panel the fifth embodiment, in that connector panel 300 has side members 302 extending between and connected to the front and rear panels and to the support members therebetween. The side members extend along the longitudinal axis of rear panel 204. Fastener receiving openings 304 are located adjacent to the top and bottom portions of the front panel 202 for securing connector panel 300 to an electrical box or patch panel, as illustrated in FIG. 1.

An adapter 320 of a somewhat different form from the previously disclosed adapters and connectors illustrated in FIGS. 16–19. Adapter 320 has a latch arm 322 with a tapered abutment 324 at its free end. The other side of the adapter has a rectangular shoulder 326. The tapered abutment and the shoulder overly the inner surface of rear panel 204 releasably latching adapter 230 in place. The adapter can be suitably configured on its internal surface for receiving different types of connectors and/or wires.

While various embodiments have been chosen to illustrate the invention, it will be understood by those skilled in the art that various changes and modifications can be made therein without departing from the scope of the invention as defined in the appended claims.

What is claimed is:

1. A modular connector panel, comprising:

a planar first panel having opposite first and second surfaces;

a plurality of first panel openings extending through said first panel in an aligned array;

support members fixed to and extending from said second surface of said first panel, said support members having near ends connected to said first panel and remote ends spaced from said first panel and including middle members extending from said first panel between each of said first panel openings and end members extending from said first panel adjacent ends of said aligned array; and oppositely directed middle abutments extending laterally from said remote ends of each of said middle members, end abutments extending laterally from said remote ends of said end members in opposite directions toward one another, said abutments being parallel to said first panel and having abutment surfaces facing said first panel, said abutments being aligned with the respective first panel opening;

whereby a connector is coupled by engaging one pair of said abutments and extends into the respective first panel opening aligned with said one pair of abutments.

2. A modular connector panel according to claim 1 wherein;

fasteners extend through receiving bores located adjacent opposite longitudinal ends of said first panel.

3. A modular connector panel according to claim 1 wherein an electrical connector comprises a resilient latch coupled to one pair of said abutments and extends into the respective first panel opening aligned therewith.

4. A modular connector panel according to claim 1 wherein an adapter is coupled to said abutments and extends into the respective first panel opening aligned therewith, said adapter having a front section with a connector receiving passageway therein.

5. A modular connector panel according to claim 4 wherein said adapter comprises resilient first and second legs extending from said front section, each of said legs including a tapered abutment intermediate ends thereof having a first shoulder surface extending from an outer surface of the respective leg and an end abutment having a second shoulder surface extending laterally from and adjacent to an end of the respective leg remote from said front section, said first and second shoulder surfaces of each of said legs being spaced to overly opposite surfaces of the respective abutments.

6. A modular connector panel, comprising:

a planar and unitary first panel having opposite outer and inner surfaces, first panel openings extending therethrough in an aligned array along a longitudinal axis, and coplanar longitudinal end portions extending beyond said aligned array along said longitudinal axis;

a planar second panel having opposite inner and outer surfaces and second panel openings extending therethrough in an aligned array, said second panel being spaced from and parallel to said first panel to define a gap therebetween with said inner surfaces thereof facing one another, each of said first panel openings being aligned with one of said second panel openings, said second panel forming abutments surrounding and defining said second panel openings; and support members fixedly and permanently connected to and extending between said longitudinal end portions of said first panel and said second panel at opposite ends of said support members.

7. A modular connector panel according to claim 6 wherein said first panel openings are rectangular.

8. A modular connector panel according to claim 6 wherein said support members comprise longitudinal end portions of said second panel extending substantially perpendicularly between said first and second panels and to said longitudinal axis.

9. A modular connector panel according to claim 8 wherein said longitudinal end portions of said first panel comprise fastener receiving bores located adjacent opposite longitudinal ends of said front panel and longitudinally beyond longitudinal ends of said second panel.

10. A modular connector panel according to claim 6 wherein said second panel openings are rectangular.

11. A modular connector panel according to claim 6 wherein said support members are unitary portions of said second panel coupled thereto by bends at ends thereof perpendicular to said longitudinal axis and remote from said first panel, near ends of said support members adjacent said first panel being secured to said first panel.

12. A modular connector panel according to claim 11 wherein said end portions of said first panel comprise connection passages extending therethrough outside of said aligned array; and said near ends of said support members comprise tabs fixed in said connection passages.

13. A modular connector panel according to claim 11 wherein said near ends of said support members comprise flanges overlying and bonded to said second surface of said front panel.

14. A modular connector panel according to claim 6 wherein an electrical connector comprises a resilient latch coupled to one pair of said abutments and extends into the respective first panel opening aligned therewith.

15. A modular connector panel according to claim 14 wherein said first panel comprises fastener receiving bores located adjacent opposite ends of said first panel.

16. A modular connector panel according to claim 6 wherein an adapter is coupled to said abutments and extends into the respective first panel opening aligned therewith, said adapter having a front section with a connector receiving passageway therein.

17. A modular connector panel according to claim 16 wherein said adapter comprises resilient first and second legs extending from said front section, each of said legs including a tapered abutment intermediate ends thereof having a first shoulder surface extending from an outer surface of the respective leg and an end abutment having a second shoulder surface extending laterally from and adjacent to an end of the respective leg remote from said front section, said first and second shoulder surfaces of each of said legs being spaced to overly opposite surfaces of the respective abutments.

18. A modular connector panel according to claim 6 wherein middle members extend from said first panel to said second panel between said first and second panel openings.

19. A modular connector panel according to claim 18 wherein side members are connected to and extend between said first and second panels and said support members.

20. A modular connector panel according to claim 6 wherein side members are connected to and extend between said first and second panels along a longitudinal axis of said second panel.

* * * * *